United States Patent [19]

Soussa

[11] 4,376,902
[45] Mar. 15, 1983

[54] HERMETIC DYNAMOELECTRIC DEVICE WITH TWO-PHASE REFRIGERANT COOLING AND SEALING

[75] Inventor: Alex J. Soussa, York, Pa.

[73] Assignee: Borg-Warner Corporation, Chicago, Ill.

[21] Appl. No.: 354,335

[22] Filed: Mar. 3, 1982

[51] Int. Cl.³ .............................................. H02K 9/20
[52] U.S. Cl. .................................................... 310/54
[58] Field of Search ........................ 310/54, 52, 64, 90

[56] References Cited

U.S. PATENT DOCUMENTS

| | | | |
|---|---|---|---|
| 3,188,833 | 6/1965 | Robinson | 62/505 |
| 3,422,635 | 1/1969 | Trenkowitz | 62/469 |
| 3,445,695 | 5/1969 | Schultz | 310/54 |
| 3,445,695 | 5/1969 | Schultz | 310/58 |
| 4,176,292 | 11/1979 | Kalsi et al. | 310/52 |

Primary Examiner—William M. Shoop
Assistant Examiner—Anita Ault
Attorney, Agent, or Firm—Julian Schachner

[57] ABSTRACT

A hermetic dynamoelectric device includes a hollow stepped shaft. Liquid refrigerant is introduced through a pipe into the shaft, where it flashes behind the step. Rotation of the shaft separates the liquid and gas phases. The liquid phase is sprayed outwardly for cooling, and the gas phase flows around the shaft into a refrigerant plenum, where it acts upon a bearing seal to prevent leakage of lubricating oil into the refrigerant circuit.

6 Claims, 2 Drawing Figures

HERMETIC DYNAMOELECTRIC DEVICE WITH TWO-PHASE REFRIGERANT COOLING AND SEALING

BACKGROUND OF THE INVENTION

This invention relates generally to a hermetically sealed dynamoelectric device such as, for example, an electric motor employed in a refrigeration compressor drive mechanism. More particularly, it relates to such a device which provides for using the liquid phase of a refrigerant for cooling, and using the gas phase for sealing.

In a hermetically sealed electric motor, it is conventional to use an externally supplied coolant to dissipate the heat generated by the resistance of the motor windings. In a typical refrigeration system, refrigerant is drawn from the condenser and separated into liquid and gas phases. The liquid phase is used to cool the rotor and stator elements of the motor. The gas phase is used to prevent leakage of lubricating oil past the motor bearing seals into the refrigerant circuit.

In this environment, it is important to protect the liquid from contact with the oil, although contact of the gas with the oil can be tolerated. Past efforts have been directed toward elaborate sealing arrangements for the bearings. The typical prior art cooling and sealing arrangements are effective but inefficient in providing adequate cooling, and are only partially effective in providing sealing.

Thus, there remains a need in the art for a hermetic dynamoelectric device with refrigerant cooling and sealing that exhibits improved operating characteristics. The device should be simple and inexpensive to construct, and should operate efficiently and reliably.

SUMMARY OF THE INVENTION

This invention is directed to a device which meets this need. To that end, there is provided a motor having a hollow stepped shaft. A pipe extends into and is spaced from this shaft. Liquid refrigerant from a condenser is introduced through the pipe, where it flashes (partially evaporates) behind the step.

As the shaft rotates, it acts as a centrifuge, separating the liquid and gas phases of the refrigerant. The liquid adheres to the inside wall of the shaft, whence it is directed through suitable jets for cooling the rotor and stator elements of the motor. The gas escapes through the clearance between the pipe and the shaft into a refrigerant plenum, where it acts upon a bearing seal to prevent leakage of lubricating oil.

BRIEF DESCRIPTION OF THE DRAWING

The objects and advantages of this invention will become apparent to those skilled in the art upon careful consideration of the specification herein, including the drawing, wherein.

Figure 1:
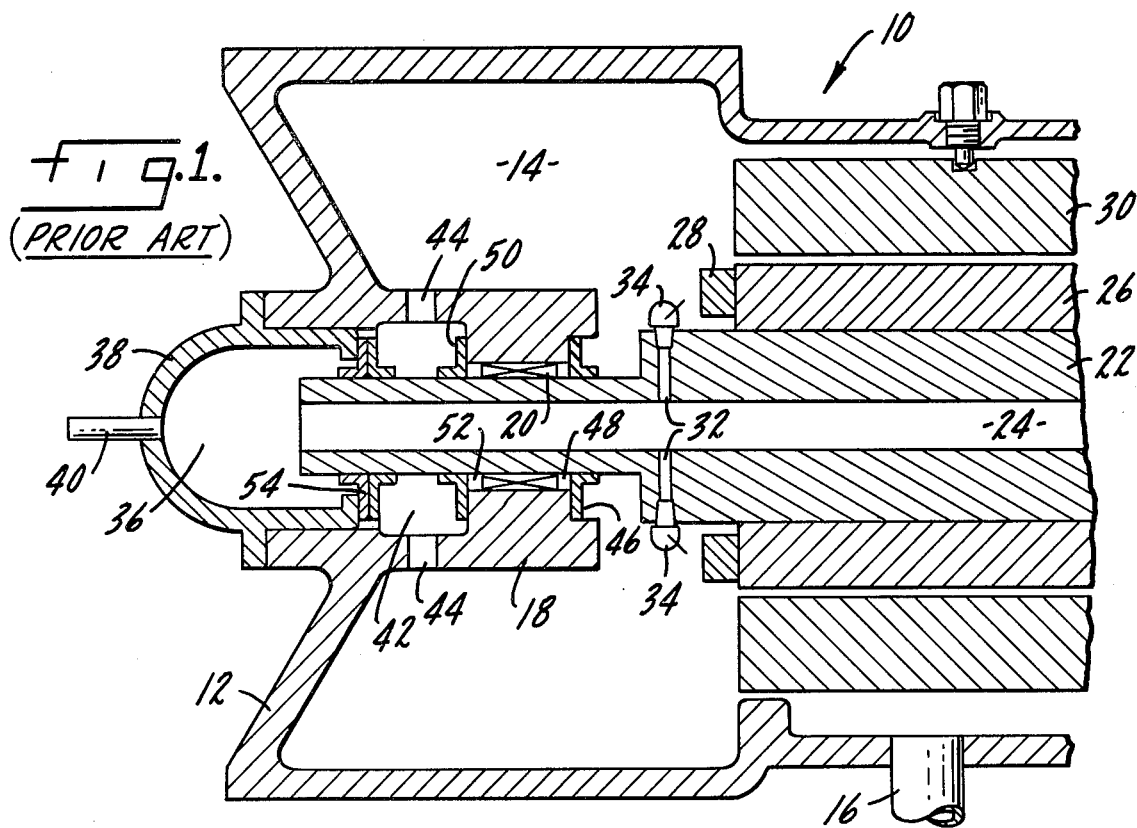
FIG. 1 is a diagrammatic illustration of a typical prior art device.

While this invention is susceptible of embodiment in many different forms, the preferred embodiment as shown in the drawing will be described in detail. It should be understood that the present disclosure is considered to be an exemplification of the principals of the invention, and is not intended to limit the invention to this embodiment.

DESCRIPTION OF THE PRIOR ART

Referring to FIG. 1 in further detail, there is shown a hermetic dynamoelectric device which is typical of the prior art. It takes the form of a motor 10 having a housing 12 which forms a motor plenum 14. As is conventional, motor plenum 14 communicates through a line 16 with the system evaporator (not shown). Motor plenum 14 is maintained at a pressure slightly higher than evaporator pressure.

Housing 12 also defines a bearing support 18 in which a suitable bearing 20 is contained. In the typical motor configuration, bearing 20 is the outboard bearing. A shaft 22 is journaled in bearing 20 and in an inboard bearing (not shown). Shaft 22 is hollow and defines a bore 24.

A rotor 26 is secured to shaft 22. Rotor 26 includes a pair of shorting rings 28, one of which is shown in the drawing. A stator 30 is secured to housing 12. On the outboard side of rotor 26, shaft 22 defines a plurality of radially oriented passages 32 communicating with bore 24 and with a plurality of jets 34. On the inboard side of rotor 26, shaft 22 defines similar passages and jets (not shown).

At the outboard end of shaft 22, bore 24 communicates with a refrigerant plenum 36 defined by housing 12 and a cover 38. As in conventional, refrigerant plenum 36 communicates through a line 40 with the system condenser (not shown). The pressure in refrigerant plenum 36 and bore 24 is maintained at an intermediate level, somewhat lower than condenser pressure but higher than motor plenum pressure.

Housing 12 further defines a chamber 42 between bearing 20 and refrigerant plenum 36. Chamber 42 is in communication with motor plenum 14 through a plurality of vent holes 44. Thus the pressure in chamber 42 is substantially the same as motor plenum pressure.

A first seal 46 is interposed between bearing 20 and motor plenum 14. Seal 46 and bearing 20 define a first oil discharge chamber 48. Similarly a second seal 50 is interposed between bearing 20 and chamber 42, and forms with bearing 20 a second oil discharge chamber 52. A third, compound seal 54 is interposed between chamber 42 and refrigerant plenum 36.

Liquid refrigerant at condenser pressure flows through line 40 into refrigerant plenum 36. Refrigerant should flow in liquid form from refrigerant plenum 36 into bore 24 of shaft 22, where centrifugal force directs it outwardly through passages 32, whence it is sprayed by jets 34 onto shorting rings 28. The liquid flashes and draws heat from rotor 26. Residual liquid is slung outwardly toward stator 30, where it cools the stator windings.

Tests have shown that the liquid sprays intermittently from jets 34. This suggests that some of the liquid flashes as it enters refrigerant plenum 36 rather than when it exits jets 34 and contacts shorting rings 28, and that some venting of gas takes place through passages 32 and jets 34. From this it appears that inefficiencies are introduced into the system.

Some of the liquid in refrigerant plenum 36 is slung outwardly by shaft 22 as it rotates. Inevitably a portion of this liquid leaks along with the gas past seal 54 into chamber 42. To compensate for this, chamber 42 is intended to act as a separator. Rotation of shaft 22 should separate the liquid and gas phases, slinging the liquid phase outwardly through vent holes 44 into motor plenum 14, and allowing the gas phase to remain in chamber 42.

As is conventional, lubricating oil under pressure is directed to bearing 20 and is collected in chambers 48 and 52. From there it flows to the system oil reservoir (not shown), which is maintained at a pressure substantially equal to evaporator pressure. The oil temperature should increase during this lubrication process. However, tests have shown that the temperature of lubricating oil leaving motor 10 is significantly lower than its temperature entering motor 10. This suggests that some liquid refrigerant remains in chamber 42, and leaks past seal 50 to cool and dilute the lubricating oil excessively. From this it appears that additional inefficiencies are introduced into the system.

DESCRIPTION OF THE PREFERRED EMBODIMENT

Figure 2:
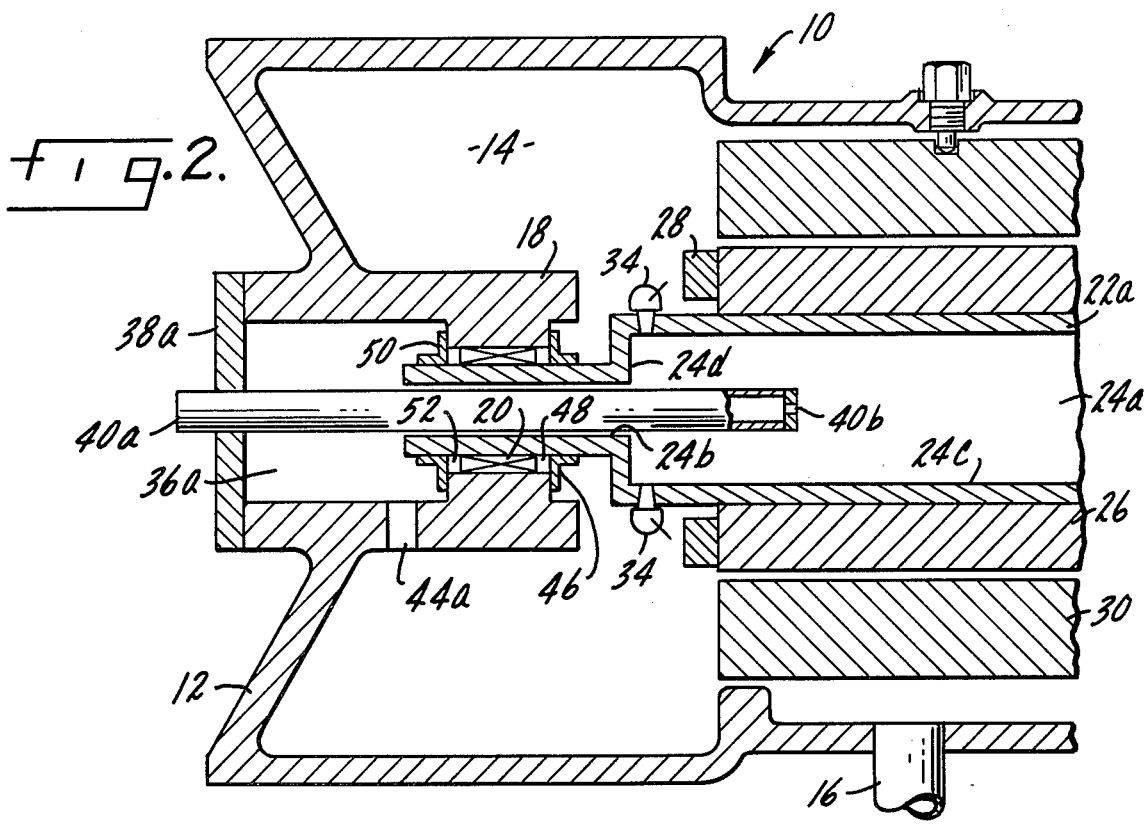
FIG. 2 is a diagrammatic illustration of the device of this invention incorporating two-phase refrigerant sealing and cooling.

Referring now to FIG. 2, wherein like components are identified by like reference numbers, the preferred embodiment of this invention is shown in detail. A shaft 22a is journaled in outboard bearing 20 and in an inboard bearing (not shown). Shaft 22a is hollow and defines a stepped bore 24a including a first relatively small bore portion 24b and a second relatively large bore portion 24c. The junction of bore portions 24b and 24c is defined by a shoulder 24d. Bore portion 24c is in direct communication with jets 34.

At the outboard end of shaft 22a, bore portion 24b communicates with a refrigerant plenum 36a. Refrigerant plenum 36a takes the place of both refrigerant plenum 36 and chamber 42. Cover 38 is replaced by a cover 38a. A single vent hole 44a communicates the lowest portion of refrigerant plenum 36a with motor plenum 14.

A line 40a, which preferably takes the form of a pipe, is welded or otherwise suitably secured to cover 38a. Pipe 40a extends through refrigerant plenum 36a and bore portion 24b into bore portion 24c. At its inboard end, pipe 40a is provided with a metering orifice 40b or the like. The outer surface of pipe 40a is spaced from the inner surface of bore portion 24b, forming therewith an annular passage communicating bore portion 24c with refrigerant plenum 36a. As refrigerant plenum 36a communicates with motor plenum 14 through vent hole 44a, bore portion 24c is maintained at an intermediate pressure only slightly higher than motor plenum pressure.

Liquid refrigerant at condenser pressure in pipe 40a flashes as it exits through orifice 40b into bore portion 24c. The gas phase remains in bore portion 24c. Due to the centrifugal force developed as shaft 22a rotates, the liquid phase adheres to the surface of bore portion 24c, whence it is sprayed by jets 34 onto shorting rings 28. The liquid flashes again and draws heat from rotor 26. Residual liquid is slung outwardly towards stator 30, where it cools the stator windings.

Orifice 40b meters the flow from pipe 40a into bore portion 24c, preventing excessive flow which could flood bore portion 24c. This allows shoulder 24d to block the backflow of liquid from bore portion 24c through bore portion 24b into refrigerant plenum 36a so long as shaft 22a is rotating. However, gas in bore portion 24c does flow through bore portion 24b into refrigerant plenum 36a. As a result, there is little or no venting through jets 34, and liquid refrigerant is sprayed from jets 34 in a substantially steady stream.

As the gas fills refrigerant plenum 36a, some of it leaks past seal 50 into chamber 52. This is the same condition that obtains at the inboard end of bearing 20, where some of the gas in motor plenum 14 leaks past seal 46 into chamber 48. This is tolerable, as the solubility of the gas in the lubricating oil follows general thermodynamic rules without harming the lubricating properties of the oil. Indeed, this leakage serves a useful purpose in that it prevents reverse leakage of lubricating oil into motor plenum 14.

Tests have shown that the temperature increase between lubricating oil entering and leaving motor 10 is noticeable. This is to be expected, as the opportunity for liquid refrigerant to contact the lubricating oil is significantly reduced.

When motor 10 is stopped, some residual liquid refrigerant in bore portion 24c may flow through bore portion 24b into refrigerant plenum 36a. Vent hole 44a acts as a drain, allowing this liquid to return through motor plenum 14 and line 16 to the evaporator.

The invention disclosed herein improves fluid flow through the jets, improves bearing sealing while requiring fewer seals, and improves the properties of the lubricating oil. This is accomplished with simpler, less costly structure than that of the prior art.

It is apparent that although the invention has been described herein as a novel arrangement for improving the cooling and sealing characteristics in a hermetic motor, it is readily adaptable for use in other hermetic devices, as well as in other environments where similar operating characteristics may be desired.

It should be understood that while a preferred embodiment of the invention has been shown and described, this is to be considered as illustrated and may be modified by those skilled in the art. It is intended that the claims herein cover all such modifications as may fall within the spirit and scope of the invention.

What is claimed is:

1. A hermetic motor comprising a housing defining a motor plenum adapted for fluid communication with an associated evaporator, said housing also defining a refrigerant plenum in fluid communication with said motor plenum, a bearing supported by said housing, a shaft journaled in said bearing, a first seal interposed between said bearing and motor plenum and defining with said bearing a first oil chamber, a second seal interposed between said bearing and refrigerant plenum and defining with said bearing a second oil chamber, said chambers being adapted for fluid communication with an associated oil reservoir, said shaft having a stepped bore including a first relatively small bore portion in fluid communication with said refrigerant plenum, a second relatively large bore portion in fluid communication with said first bore portion, and a shoulder at the junction of said bore portions, a rotor secured to said shaft, a stator secured to said housing, a plurality of jets adjacent said rotor in fluid communication with said second bore portion, and a line adapted for fluid communication with an associated condenser, said line being in fluid communication with said second bore portion for delivery of liquid refrigerant thereto.

2. The motor of claim 1, wherein said line is provided with means for metering the liquid refrigerant delivered to said second bore portion.

3. The motor of claim 1, wherein said line is a pipe secured to said housing and extending through said first bore portion into said second bore portion, the outer surface of said pipe being spaced from the inner surface of said first bore portion.

4. The motor of claim 3, wherein said pipe is provided with means for metering the liquid refrigerant delivered to said second bore portion.

5. The motor of claim 4, wherein said metering means is an orifice through which said pipe is in fluid communication with said second bore portion.

6. The motor of claims 1, 2, 3, 4, or 5, wherein said housing is provided with a vent hole at the bottom of said refrigerant plenum to thereby provide said fluid communication of said refrigerant plenum with said motor plenum.

* * * * *